(12) United States Patent
Burge

(10) Patent No.: US 7,877,930 B2
(45) Date of Patent: Feb. 1, 2011

(54) METHODS AND SYSTEMS OF POROUS RECEPTACLES

(75) Inventor: Christine J. Burge, Fort Collins, CO (US); Gary D. Burge, legal representative, Fort Collins, CO (US)

(73) Assignee: Aspen West Partners, LLC, Fort Collins, CO (US)

( * ) Notice: Subject to any disclaimer, the term of this patent is extended or adjusted under 35 U.S.C. 154(b) by 0 days.

(21) Appl. No.: 12/487,465

(22) Filed: Jun. 18, 2009

(65) Prior Publication Data

US 2009/0249687 A1 Oct. 8, 2009

Related U.S. Application Data

(63) Continuation of application No. 11/051,409, filed on Feb. 4, 2005, now abandoned.

(51) Int. Cl.
*A01G 27/00* (2006.01)
(52) U.S. Cl. .............................. 47/80; 47/65.6; 47/66.7
(58) Field of Classification Search .................. 47/65.6, 47/71, 66.7, 48.5, 64, 80, 81, 59 S
See application file for complete search history.

(56) References Cited

U.S. PATENT DOCUMENTS

| | | | |
|---|---|---|---|
| 3,896,587 A | | 7/1975 | Insalaco |
| 3,958,365 A | | 5/1976 | Proctor |
| 4,166,340 A | | 9/1979 | Pluenneke |
| 4,379,375 A | | 4/1983 | Eisenberg et al. |
| 4,777,763 A | | 10/1988 | Shannon et al. |
| 4,782,627 A | | 11/1988 | Hauk |
| 4,908,986 A | * | 3/1990 | Rowland et al. ............... 47/80 |
| 4,933,306 A | * | 6/1990 | Pietsch ......................... 501/39 |
| 5,018,300 A | | 5/1991 | Chiu et al. |
| 5,022,182 A | | 6/1991 | Anderson |
| D328,725 S | | 8/1992 | Deutschmann, Sr. |
| 5,157,869 A | | 10/1992 | Minton |

(Continued)

FOREIGN PATENT DOCUMENTS

JP 20010953387 A 4/2001

(Continued)

OTHER PUBLICATIONS

"Root Rot of Houseplants," Pest Diagnostic Clinic, Fact sheet on root rot of houseplants, Laboratory Services Division, University of Guelph, Ontario; http://www.uoguelph.ca/pdc/Factsheets/Diseases/RootRotHouseplants.htm; Jul. 27, 2004; 2 pages.

(Continued)

*Primary Examiner*—Rob Swiatek
*Assistant Examiner*—Kristen C Hayes
(74) *Attorney, Agent, or Firm*—Santangelo Law Offices, PC

(57) ABSTRACT

Drainage systems for plant gardening in flowerpots, specifically a shaped porous rock or perhaps even an enclosed pouch having soil preservation capability and filling inside the enclosed pouch. Embodiments may include a pot hole locator which may place an enclosed pouch in a bottom of a pot prior to adding soil and planting a plant in a flowerpot. Other embodiments may include the addition of soil amendments, water retention elements, drying elements and the like. Filling may include plastic, various rocks, various stones, pebbles, synthetic materials and the like.

13 Claims, 4 Drawing Sheets

U.S. PATENT DOCUMENTS

| | | | |
|---|---|---|---|
| 5,171,390 | A | 12/1992 | Travers |
| 5,181,951 | A | 1/1993 | Cosse, Jr. |
| 5,225,342 | A | 7/1993 | Farrell |
| 5,363,592 | A | 11/1994 | Weder et al. |
| 5,454,191 | A | 10/1995 | Mayeda et al. |
| 5,937,577 | A | 8/1999 | Butler et al. |
| 6,094,862 | A * | 8/2000 | Fuchigami ............. 47/81 |
| 6,296,068 | B1 | 10/2001 | Frederick |
| 6,318,022 | B1 | 11/2001 | Just |
| 6,536,160 | B1 | 3/2003 | Morlier et al. |
| 6,606,821 | B1 | 8/2003 | Connelly |
| 6,637,155 | B1 | 10/2003 | Butler et al. |
| 6,675,533 | B2 | 1/2004 | Morlier et al. |
| 6,701,666 | B1 | 3/2004 | Paulino |
| 6,722,081 | B1 | 4/2004 | Bradley et al. |
| 2002/0007590 | A1 | 1/2002 | Just |
| 2003/0182857 | A1 | 10/2003 | Just |
| 2006/0185238 | A1 | 8/2006 | Burge |
| 2009/0013598 | A1* | 1/2009 | Mileto ............. 47/48.5 |
| 2010/0005717 | A1* | 1/2010 | Guzzetta ............. 47/65.6 |
| 2010/0139158 | A1* | 6/2010 | Johnson ............. 47/48.5 |

FOREIGN PATENT DOCUMENTS

| | | |
|---|---|---|
| WO | 99/59397 | 11/1999 |

OTHER PUBLICATIONS

"Solutions / New Uses for Old Things," magazine article (coffee filter); Real Simple, Aug. 2004; 1 page.

Espresso Pods by Starbucks; http://www.cooking.com/products/shprodde/asp; Cooking.com (tm); Oct. 1, 2004; 2 pages.

Home Harvest (R) Garden Supply, Inc., Helpign the World Growl; Catalog Table of Contents; http://homeharvest.com/ table.htm; Oct. 15, 2004; 3 pages.

"Do It Yourself: Plant Types," DIY Gardening and Landscaping; http://www.diynet.com; Jul. 26, 2004; 3 pages.

"Tips for Container Gardening," Lowe's Improving Home Improvement, http://www.lowes.com; Jul. 26, 2004; 5 pages.

"Soy Underwear? China Targets Eco-friendly Clothes Market," The Wall Street Journal, Dec. 17, 2004; 2 page.

"Grow Like a Pro: Landscape Expert Offers Tips for a Thriving Container Garden," The Office Company, Oct. 7, 2006; 3 pages.

"Florian Ratchen-Cut Pruning Tools," Flow 'n Grow Drain; www.floriantools.com, Oct. 13, 2006; 2 pages.

Pontz, Rick; "Just Grow Up—Trade Secrets to Bringing Your Lawn and Garden Product to Market," 2004; 5 pages.

Tanaka translation retrieved from JPO Aug. 28, 2008.

File wrapper for priority case U.S. Appl. No. 11/051,408, filed Feb. 4, 2005 (entire file wrapper available online).

* cited by examiner

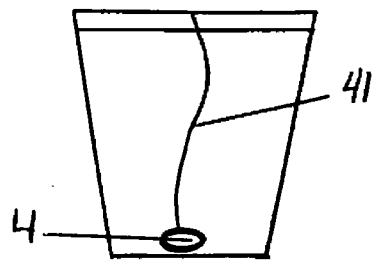
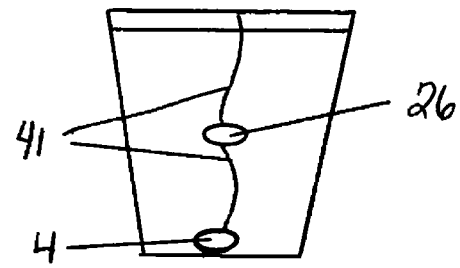
FIG. 11   FIG. 12
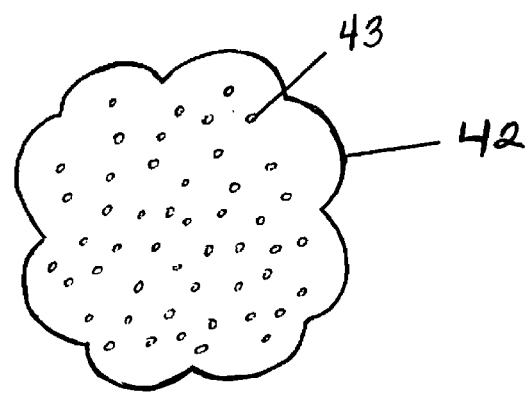
FIG. 13

METHODS AND SYSTEMS OF POROUS RECEPTACLES

This application is a continuation of U.S. application Ser. No. 11/051,409, filed Feb. 4, 2005, hereby incorporated by reference herein.

BACKGROUND OF THE INVENTION

This invention relates to drainage systems for container gardening such as planting in flowerpots. In particular, the invention relates to apparatus and methods of providing a porous rock or perhaps even a pocket having a filling that can be placed over a hole of a flowerpot prior to or perhaps even after planting.

When planting plants in flowerpots, it may be desirable to provide adequate drainage of liquids, such as water and fertilizers, to the soil and plant(s). Root rot may be a common disease of container plants and even household plants. Affected plants, if not killed, may be stunted, of low vigor, may show desiccation, wilt, leaf scorch, dullness, yellowing of foliage and perhaps even other symptoms of drought stress, despite ample soil moisture.

Root rot may be caused by soil borne fungi including *Pythium* spp., *Phytophthora* spp., *Fusarium* spp., *Rhizoctonia* spp., and others. These fungi may invade through wounds or may directly penetrate stressed roots of a plant. Prolonged periods of excessive soil moisture, or water logging, may result in oxygen starvation of roots which may kill roots outright or perhaps render them more susceptible to invasion by root rotting organisms. Conditions of excessive soil moisture also favor the growth of many root-rotting pathogens.

It may be desirable to use pots with drainage holes in the bottom to allow water to drain out of the pot. A drainage hole may even flush excess salts from the soil. A problem associated with using a pot having a drainage hole may be that soil and the like may also be flushed out of the pot. Previous attempts to resolve this problem may have included using a coffee filter or even a paper towel and placing these over the hole at the bottom of the pot. These may not adequately provide a durable and effective filtration system. Also, some may use loose rocks, broken ceramics or the like and place them into the bottom of the pot over the drainage hole. Loose rocks or ceramics may either be too large and prevent drainage from a pot, or perhaps may be too small in which they can pass through a drainage hole.

Further, U.S. Pat. No. 6,701,666 to Paulino describes a system for cultivating plants in a planting area having a ground surface where a hole is initially dug to a depth of three feet below the ground surface and a layer of ceramic tiles may be established at the bottom of the hole and covered by a layer of rocks. Also, the Paulino reference includes a pot having rocks and even a filter sheet placed above the rocks wherein wick assemblies may be in communication with the pot holes.

In U.S. Pat. No. 6,722,081 to Bradley et al., along with several other patents, a plant liner, specifically using sphagnum moss or the like as liners, for hanging baskets is described. This patent discusses a water resistant layer between a first and second layer of plant material. Liners such as those disclosed in U.S. Pat. No. 5,454,191 to Mayeda et al., may act as a highly efficient water controlling barrier and may reduce water waste because of its water controlling capabilities. This may be unlike the direction of the present invention which may provide a solution for adequate drainage of water from potted plants.

SUMMARY OF THE INVENTION

It is therefore an object of the present invention to provide a system which can prevent soil and the like from escaping from pots while allowing adequate drainage of liquids from a potted plant.

It is an object of the present invention to provide a shaped porous rock that can be placed over a hole in a pot in accordance with embodiments of the present invention.

It is another object of the present invention to provide an enclosed pouch with a filling that can be placed over a hole in a pot.

It is yet another object of the present invention to provide a hole placement feature to facilitate easy placement of a pouch or shaped porous rock in a pot.

Another object of the present invention may be to provide a lightweight pouch to be used in a flowerpot.

It is yet another object of the present invention to provide a system and method of pouches that are environmentally sound.

Naturally, further objects, goals and embodiments of the inventions are disclosed throughout other areas of the specification claims.

BRIEF DESCRIPTION OF THE DRAWINGS

FIG. 11 is an alternative embodiment of a soil amendment disperser.

FIG. 12 is an alternative embodiment of a soil amendment disperser.

FIG. 13 is a shaped porous rock according to embodiments of the present invention.

DETAILED DESCRIPTION OF THE PREFERRED EMBODIMENTS

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
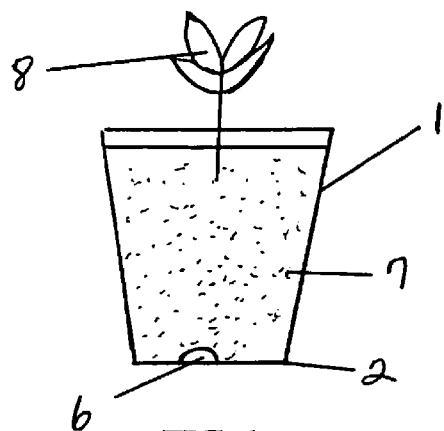
FIG. 1 shows a plant potted in a flowerpot.
Figure 3:
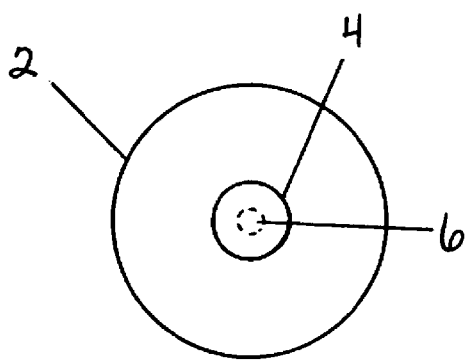
FIG. 3 shows a top view of an enclosed pocket over a hole at a bottom of a flowerpot in accordance with some embodiments of the present invention.

In embodiments, the present invention includes a flowerpot drainage apparatus and methods for potting plant containers which may include a pouch, such as an enclosed pouch, and filling inside of the pouch. In other embodiments, the present invention may include a shaped porous rock (42). As can be understood from FIGS. 1 and 3, to use a pouch or shaped porous rock, a plant pot (1) having a hole at a bottom (2) of it may be provided and an enclosed pouch (4) or perhaps even a shaped porous rock may be placed over the hole (6). Any type of pot or plant container may be used in the various embodiments of this invention. Soil (7), which may include fertilizer, may then be placed in the pot (1) and over a pouch or perhaps even a porous rock. A plant (8) may be placed or planted into the soil (7) and water (9) may be added to the plant (8) and its roots. By planting, a user may dig a hole in the soil, place a plant into the hole and cover roots of the plant with additional soil.

An enclosed pouch (4) or perhaps even a shaped porous rock (42), in various embodiments, may have a soil preservation capability which may allow drainage of liquids from a pot while allowing the soil and perhaps even nutrients, fertilizer and the like to remain in the pot. Accordingly, in embodiments, the present invention may provide a step of substantially preventing soil from escaping through a hole of a pot with an enclosed pouch or even a shaped porous rock and perhaps even substantially filtering soil from water with an enclosed pouch or a shaped porous rock. Of course, it is understood that at least a small amount of soil could pass through a pouch or even a shaped porous rock. Accordingly, "substantially" could include ample, or a considerable amount, or the like.

Figure 2:
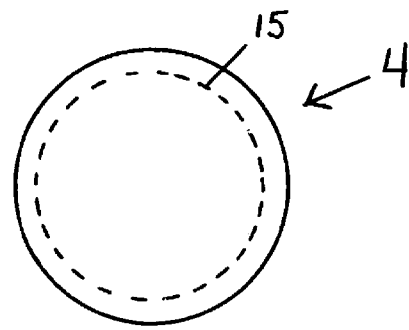
FIG. 2 shows a top view of an enclosed pocket in accordance with some embodiments of the present invention.
Figure 4:
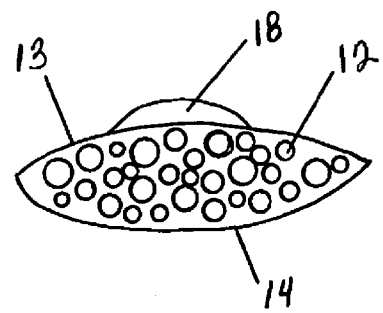
FIG. 4 shows a partial side view of an enclosed pocket having a filling in accordance with some embodiments of the present invention.

An enclosed pouch (4) may include at least a first (13) and a second surface (14) as can be seen in FIG. 4. In FIG. 2, edges of a first and perhaps even a second surface may be attached with a stitching (15), adhesive or the like. Any kind of attachment can be used to attach material or the like together and all are meant to be included in this disclosure. Examples of adhesives may include, but are not limited to, tape, fastening tape, double sided tape, heat seal, glue and the like. In an embodiment, a pot hole locator (18) may be provided on a pouch or even a shaped porous rock to assist a user in locating a hole at a bottom of a pot for placement of a pouch or porous rock and perhaps even to hold a pouch or porous rock in place over a hole during the planting process and the like. A hole locator (18) may be located on a surface, such as a first surface (13) of a pouch, as can be seen in FIG. 4. A hole locator may be a nodule on the surface of a enclosed pouch or may even be a nodule on a surface of a shaped porous rock. A nodule may be of a size and perhaps even a shape appropriate to fit within most holes of pots. A nodule may be a shaped piece of fabric or the like which may be part of a first surface or may even be a separate attached piece.

In alternative embodiments, an enclosed pouch having a filling or even a shaped porous rock may be attached to a pot such as a bottom of a pot. An enclosed pouch or porous rock may be integral to the plant pot so that for use, a user may not need to obtain additional materials for drainage of the pot.

Figure 6:
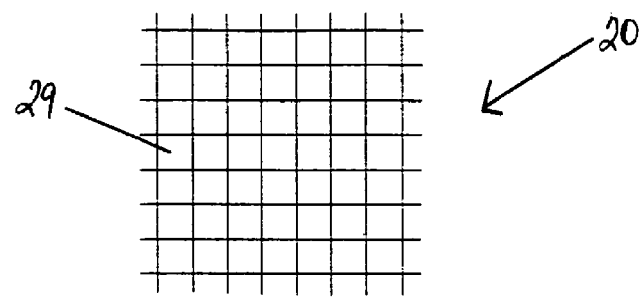
FIG. 6 is representative of a magnified version of a material having pores.

A surface of a pouch may be a porous skin (20) or the like which has pores (29) as shown in FIG. 6 that may allow liquid such as water to pass through the skin. A surface or perhaps even a porous skin of an enclosed pouch may be made of a material such as but not limited to cotton, plastic, wool, synthetic fibers, paper, polyester, cheesecloth, hemp, nylon, screens, non-disintegratable materials, non-disposable materials, and the like materials. Pores can also be defined by different fabric weaves and the like which ultimately allow for different amounts of liquids to pass through them. Alternatively, a shaped porous rock (42) may include pores (43) which may allow liquid, such as water, to pass through and drain from a pot. This may cause substantial filtering of water with the pores of a shaped porous rock.

Figure 5:
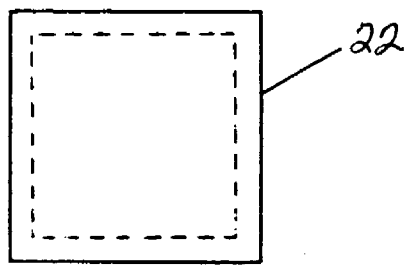
FIG. 5 shows an alternative embodiment of an enclosed pocket.

In embodiments, a material may be a colored material or even a scented material. An enclosed pouch or perhaps even a shaped porous rock may be a circular shape, as shown in FIG. 2, a rectangular shape (22), as shown in FIG. 5, a square shape or perhaps even any shape. A pouch or a shaped porous rock may be large for larger pots or may even be small for smaller pots. An enclosed pouch or a shaped porous rock may have a size of about 10 centimeters in diameter and perhaps about 2 centimeters in width. Of course, many possibilities of sizes and shapes for a pouch or a shaped porous rock exist and all are meant to be included in this disclosure. A shaped porous rock may be a substance, such as a synthetic or natural substance that may be modified to a desired form or shape such as by filing, chipping, molding, cutting, or any kind of shaping mechanism.

Figure 7:
FIG. 7 is representative of multiple layers of a material in accordance with some embodiments of the present invention.

In other embodiments and as shown in FIG. 7, the present invention may provide a multi-layered material (31) for an enclosed pouch. A sheet of material may be multiply layered over each other. This may provide a finer filter for liquid to pass through and allow for perhaps even less solid material to escape.

In yet other embodiments, it may be desirable to provide a reusable pouch or perhaps even a reusable porous rock so that a user can reuse an enclosed pouch or a shaped porous rock, such as from one pot to the next. An enclosed pouch may be openable so that filling can be placed or removed. In embodiments, filling may be reused as well. In steps, a user may open an enclosed pouch, add a filling to it and close the filled pouch. An opening of an enclosed pouch may be an opening such as, but not limited to, fastening tape such as Velcro®, buttons, stitching, adhesive, zippers, string, clips, glue, heat seal and the like.

It may be desirable, in embodiments, to provide a pouch or a shaped porous rock that may be environmental sound or beneficial to the environment. The present invention may provide in embodiments, a disintegratable pouch, recyclable pouch and the like, or a disintegratable porous rock, recyclable porous rock and the like. A pouch or a shaped porous rock may be made of a natural material which when used, reused, or perhaps even disposed of will not harm the environment.

Figure 9:
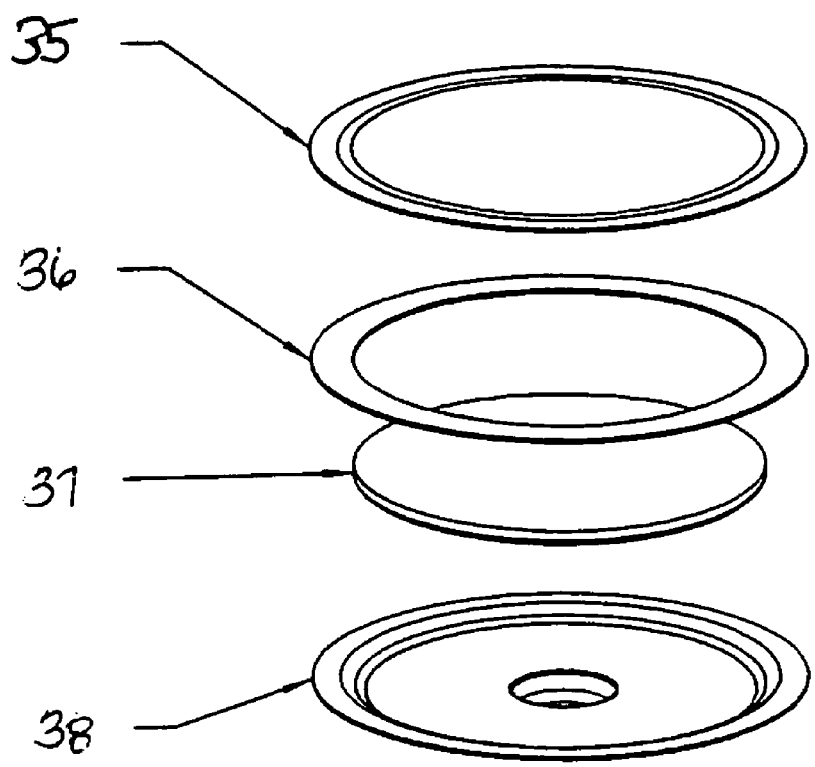
FIG. 9 is representative of an alternative embodiment of the present invention having a top layer, adhesive, filling and bottom layer of a pouch.

A filling (12) may be included in an enclosed pouch, such as seen in FIGS. 4 and 9. A filling may be any kind of substance which may further assist in the drainage of water from a potted plant. A filling may include, but is not limited to, individually and possibly in combination, the following: at least a fertilizer, a water retention element, a drying element, at least some rocks, sweater stone or pieces of sweater stone, porous stones, natural rocks, synthetic rocks, at least some small rocks, lava rocks, pumice, expanded plastic such as Styrofoam®, pebbles and the like. A filling may even include soil amendments in a pocket. Soil amendments may include, yet are not limited to, moss, peat, sphagnum moss, earthworm castings, organic enrichment, perlite, vermiculite, pH amendments, shellfish amendments, soil purification, soil testing, bark, leaves, wood chips and the like.

Figure 8:
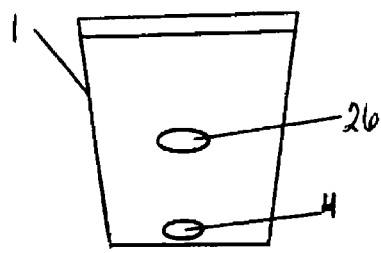
FIG. 8 shows a pot having an enclosed pocket and a nutrient pouch in accordance with some embodiments of the present invention.

Alternatively and as shown in FIG. 8, a nutrient pouch (26) may be placed in a pot (1). A nutrient pouch (26) may contain at least one or even some soil amendments, as previously discussed and may be located at any desired place within a pot. As an example, an enclosed pouch (4) may be placed at the bottom of a pot, a first amount of soil may be placed in about half of the pot, a nutrient pouch may be placed in the middle of the pot in the first amount of soil, and a second amount of soil may be placed over the nutrient pouch to fill the pot.

It may be desirable in some embodiments, to provide dispersing of soil amendments throughout soil of a potted plant, such as with a soil amendment disperser (41). A string, solid element or the like may be attached to a pouch, a porous rock or perhaps even a nutrient pouch where nutrients, such as liquid nutrients, may travel along a string, such as but not limited to by capillary action or the like, and can be distributed throughout the soil. A string may be placed within soil such as shown in FIGS. 11 and 12. A string or even two strings, or more may be attached to a pouch, such as above and possibly even attached below a pouch.

In other embodiments, the present invention may provide balancing a soil preservation capability with a drainage capability. There may be an appropriate balance between providing an amount of water drainage through a pouch or a shaped porous rock while allowing soil to remain in a pot. This may include reducing the pore size of any type of material that becomes the filter of the soil and water. A pore may be a hole, a material having holes, a large hole, minute opening, and the like in which substances may pass through. In this instance, substances may include water, fertilizer, soil particles, plant particles, and the like. At some point pores may be too small to allow adequate drainage of liquids, which may be undesirable and inconsistent with this invention. Contrarily, pores may be too large and can allow soil to pass through along with the liquids such as water.

A filling in a pocket may help with the soil preservation and drainage capability. Accordingly, there may be a balance between the size of the pores, the type of filling and perhaps even a water flow to provide optimal conditions for a potted plant. As an example, a material, such as Clorox Handiwipes, soy fabric or even hemp material may be used as a single layer for an enclosed pouch and a filling, such as lava rocks, may fill an inside of the pouch. This combination of filling and material of a pouch may provide a balance of soil preservation capability with drainage capability. It may also be desirable to provide a material used for a pouch that may be unbleached and even unpatterned. In yet other embodiments, a material for a pouch may be cloth, such as general cleaning cloths, reusable cloths and the like.

A shaped porous rock (42) may include, in embodiments, a flowerpot drainage capability and a flowerpot soil preservation capability. This may be accomplished by providing pores (43) in accordance with the discussion as herein provided. In embodiments, a shaped porous rock may be a synthetic stone having pores, a natural stone having pores, sweater stone and the like.

To prevent exposure of a plant to any contaminants, microorganisms, bacteria and other harmful substances, a shaped porous rock, an enclosed pouch or perhaps even a filling in the enclosed pouch, in various embodiments, may be sterilized. As may be appreciated by those skilled in the art, this may occur by heating a pouch to a certain temperature to destroy undesirable substances, by adding chemicals to the pouch, porous rock, filling or the like, as well as other sterilization methods.

It may be desirable to provide a lightweight pouch and filling for easy handling and use of an enclosed pouch. A lightweight pouch and filling may, in an embodiment, be about one pound. In other embodiments, a lightweight pouch may be any of numerous weights, some of these including:

less than about 0.5 pounds;
less than about 1 pound;
less than about 1.5 pounds; and
less than about 2 pounds.

While each of these are non-limiting examples, it is meant to be understood that all weights are meant to be included in this disclosure. It may also be desirable to provide a lightweight shaped porous pouch, in other embodiments.

Alternatively, in embodiments, the present invention may provide a heavy pouch to weigh down a pot that may be placed outdoors where winds may knock a plant over or perhaps even in a high traffic area when if bumped, a potted plant could remain upright. This may be established by using a filling that has some weight. Metals may be used as well as other heavier substances. In other embodiments, it may be desirable to provide a heavy porous rock and the like.

In other alternative embodiments and as shown in FIG. 9, an enclosed pouch may include, a top fabric (35), an adhesive (36), a filling, such as a layer of lava rocks or even puma rock, represented by (37), and a bottom fabric (38).

Figure 10:
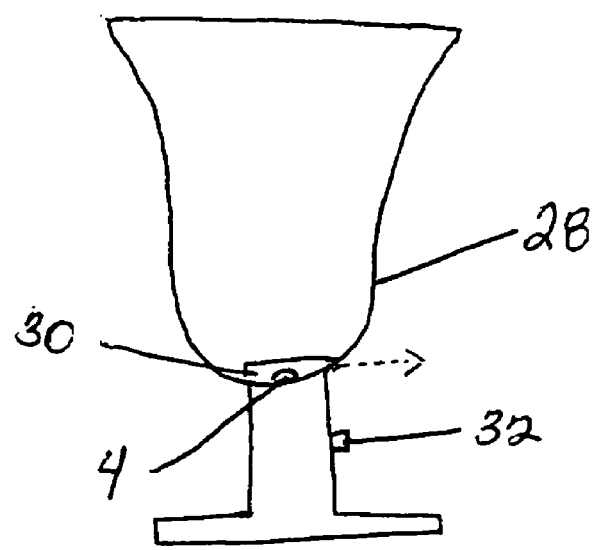
FIG. 10 is an alternative embodiment of a pot having a drawer in which an enclosed pouch or shaped porous rock can be inserted in accordance with some embodiments of the present invention.

A pot may be various shapes and sizes and may even have a pedestal, such as the container (28) shown in FIG. 10. A drawer (30) may be located in a pot such as but not limited to where a drainage hole may be located. A drawer may be a sliding, horizontal compartment that may be drawn out in order to gain access to it. A drawer may slide out and allow a user to place an enclosed pouch or a shaped porous rock into a drawer to which a user can push the drawer back into the pot. A drawer may be structured so that an enclosed pouch or a shaped porous rock may sit in or attach to a drawer so that the pouch or rock can be held in place while still allowing proper drainage. A drawer may be used to replace an enclosed pouch or a shaped porous rock without having to remove the contents of a pot. Below an enclosed pouch or a shaped porous rock and perhaps even below a drawer may be located a plug (32). A plug may be at a location in which water can collect and when a plug is opened, water and the like can be drained from a pot.

As can be easily understood from the foregoing, the basic concepts of the present invention may be embodied in a variety of ways. It involves both drainage techniques as well as devices to accomplish the appropriate drain. In this application, the drainage techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that are included herein or added in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon in any subsequent patent application. It should be understood that such language changes and broader or more detailed claiming may be accomplished at a later date or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "locator" should be understood to encompass disclosure of the act of "locating"—whether explicitly discussed or not—and, conversely, were there effectively disclosure of the act of "locating", such a disclosure should be understood to encompass disclosure of a "locator" and even a "means for locating". Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the drainage devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 U.S.C. §132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for potting in plant containers comprising the steps of:
    providing a pot having a hole at a bottom of said pot;
    providing a lightweight circular shaped enclosed pouch comprising:
        a first circular shaped porous skin having a substantially flat surface;
        a second circular shaped porous skin having a substantially flat surface wherein said second circular shaped porous skin is similarly shaped to said first circular shaped porous skin; and
        a filling containing nutrients;
        wherein said filling is contained in said lightweight circular shaped enclosed pouch by sealed attachment of substantially all of an edge of said first circular shaped porous skin to substantially all of an edge of said second circular shaped porous skin with a heat seal;
    placing said lightweight circular shaped enclosed pouch having said filling over said hole in said bottom of said pot, wherein said filling comprises a plurality of synthetic porous rocks;
    placing soil over said lightweight circular shaped enclosed pouch in said pot;
    planting at least one plant in said soil of said pot to establish a potted plant;
    adding water to said plant in said soil in said pot;
    substantially preventing said soil from escaping through said hole in said bottom of said pot with said lightweight circular shaped enclosed pouch;
    substantially filtering said soil from said water with said lightweight circular shaped enclosed pouch; and
    retaining at least some of said water in said plurality of synthetic porous rocks to provide balanced soil moisture conditions;
    wherein said lightweight circular shaped enclosed pouch further comprises a soil amendment disperser, wherein one end of said soil amendment disperser is attached to said lightweight circular shaped enclosed pouch allowing the rest of said soil amendment disperser including an opposite end of said soil amendment disperser to project substantially into said soil from said lightweight circular shaped enclosed pouch to disperse said nutrients into said soil; and wherein said lightweight enclosed pouch is less than about 1.5 pounds in weight.

2. A method for potting in plant containers according to claim 1 and further comprising the step of a balancing a soil preservation capability with a drainage capability so as to provide optimal conditions for said potted plant.

3. A method for potting in plant containers according to claim 1 and further comprising the step of locating said hole at said bottom of said pot with said enclosed pouch.

4. A method for potting in plant containers according to claim 1 wherein said filling further comprises at least some fertilizer.

5. A method for potting in plant containers according to claim 1 wherein said filling further comprises at least one soil amendment.

6. A method for potting in plant containers according to claim 5 wherein said soil amendment is selected from a group consisting of moss, peat, sphagnum moss, earthworm castings, organic enrichment, perlite, vermiculite, pH amendments, shellfish amendments, soil purification, soil testing, bark, leaves and wood chips.

7. A method for potting in plant containers according to claim 5 and further comprising the step of dispersing said soil amendments throughout said soil.

8. A method for potting in plant containers according to claim 1 wherein said step of placing said enclosed pouch over said hole in said bottom of said pot comprises the step of attaching said enclosed pouch to said pot.

9. A method for potting in plant containers according to claim 1 wherein said plurality of synthetic porous rocks comprises non-substantially smooth spherical surfaces.

10. A method for potting in plant containers according to claim 1 and further comprising the step of sterilizing said enclosed pouch.

11. A method for potting in plant containers according to claim 1 and further comprising the step of reusing said enclosed pouch.

12. A method for potting in plant containers according to claim 1 and further comprising the step of dispersing a soil amendment with said soil amendment disperser by capillary action.

13. A method for potting in plant containers according to claim 12 wherein said soil amendment is selected from a group consisting of moss, peat, sphagnum moss, earthworm castings, organic enrichment, perlite, vermiculite, pH amendments, shellfish amendments, soil purification, soil testing, bark, leaves and wood chips.

* * * * *